United States Patent

Sharpe et al.

[15] 3,686,704
[45] Aug. 29, 1972

[54] LAMP ASSEMBLIES FOR ROAD VEHICLES

[72] Inventors: John William Sharpe, 217 Tamworth Road, Sutton Coldfield, Warwickshire; Alfred Dickens Baker, 3 Alder Park Road, Solihull, Warwickshire, both of England

[22] Filed: March 16, 1970

[21] Appl. No.: 19,784

[30] Foreign Application Priority Data

March 28, 1969 Great Britain..........16,412/69

[52] U.S. Cl. ............15/250.01, 15/250.27, 15/250.3
[51] Int. Cl..............................B60s 1/06, B60s 1/46
[58] Field of Search.........15/250.01, 250.02, 250.03, 15/250.04, 250.3, 250.27

[56] References Cited

UNITED STATES PATENTS

| 3,599,269 | 8/1971 | Congdon | 15/250.04 |
| 2,399,652 | 5/1946 | Rappl | 15/250.3 UX |
| 3,456,278 | 7/1969 | Mandy et al. | 15/250.02 |

FOREIGN PATENTS OR APPLICATIONS

| 208,442 | 1/1940 | Switzerland | 15/250.3 |

*Primary Examiner*—Peter Feldman
*Attorney*—John C. Holman and Marvin R. Stern

[57] ABSTRACT

A lamp assembly for a road vehicle including a mounting plate which in use extends transversely of the vehicle. The mounting plate carries a pair of lamp units which are mounted adjacent one another on the mounting plate, so as to be at the left-hand side or the right-hand side of the front of the vehicle. A wiper arm is carried on a linkage arrangement supported by the mounting plate, and the wiper arm extends forwardly of the vehicle between the two lamp units. At its outer end the wiper arm is provided with a pair of wiper blades which extend in opposite directions one of the blades engaging the lens of one of the lamp units while the other blade engages the lens of the other lamp unit. A drive motor drives the linkage arrangement, and the linkage arrangement is such that the wiper arm moves in such a path that the wiper blades wipe the front surfaces of the lenses of the two lamp units. A second pair of lamp units can be mounted on the mounting plate at the opposite side of the vehicle, and the same drive mechanism can drive a second wiper arrangement associated with the other pair of lamps units. In addition, the wiping systems can incorporate means for supplying washing fluid to the lenses of the lamps during wiping.

6 Claims, 4 Drawing Figures

LAMP ASSEMBLIES FOR ROAD VEHICLES

This invention relates to lamp assemblies for road vehicles.

A lamp assembly according to the invention includes a mounting plate which in use, extends transversely of a vehicle, a pair of light units mounted adjacent one another on said mounting plate so as to be at one side or the other of the front of the vehicle in use, a movable wiper arm extending forwardly between said light units, a pair of wipers extending in opposite directions from said wiper arm and engageable with said light units respectively, and means for moving said wiper arm in such a manner that wipers wipe the front surfaces of the light units respectively.

Figure 1:
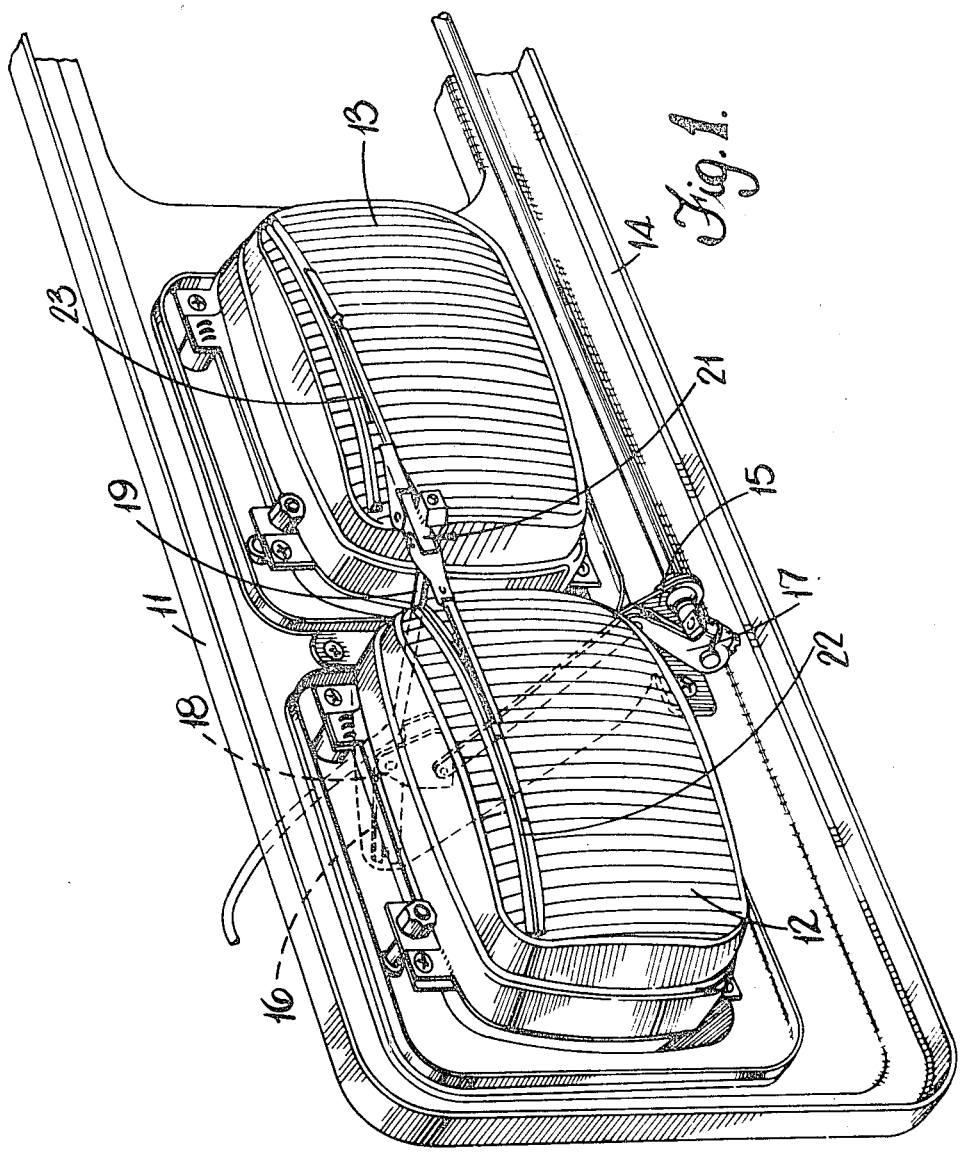
Figure 2:
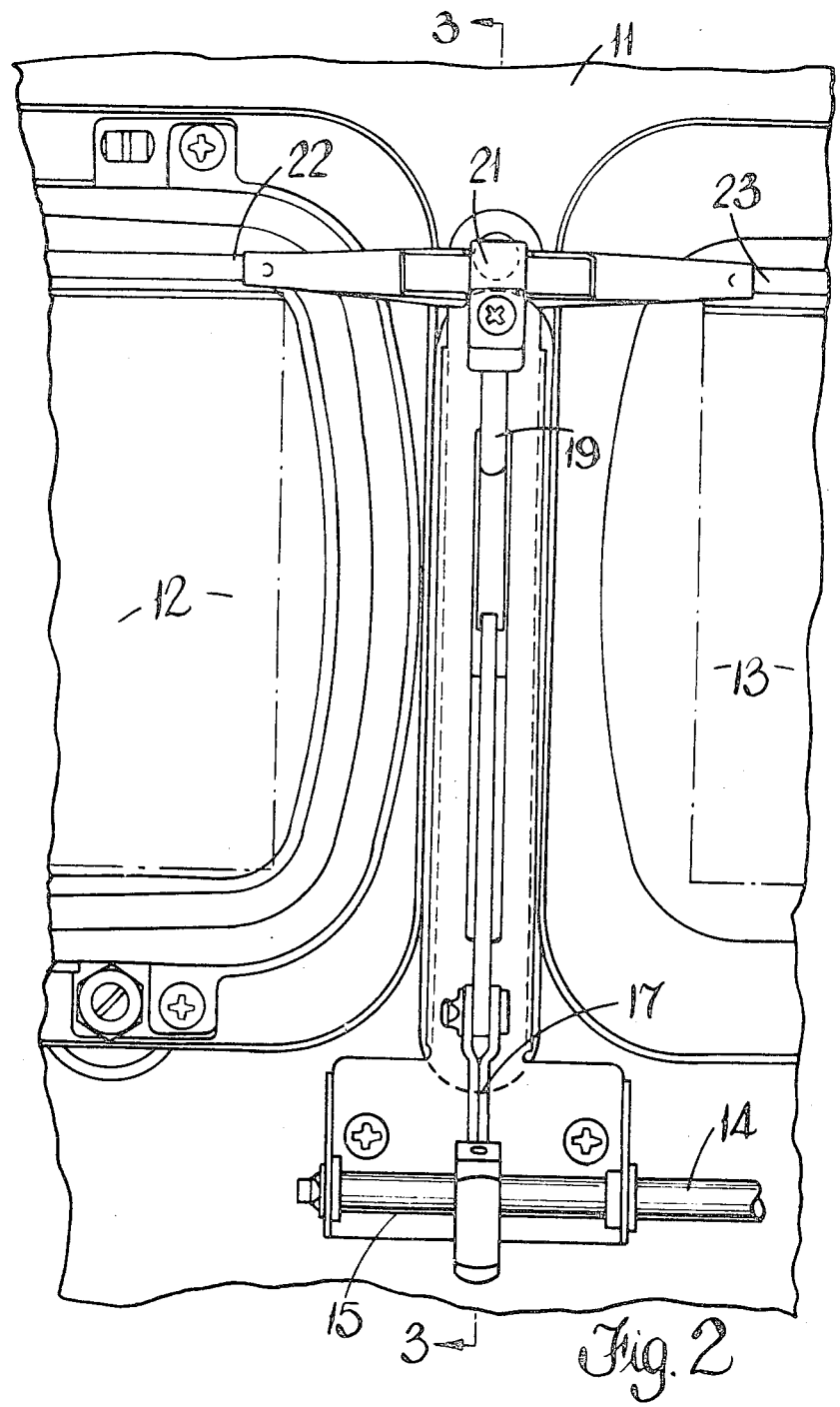
Figure 3:
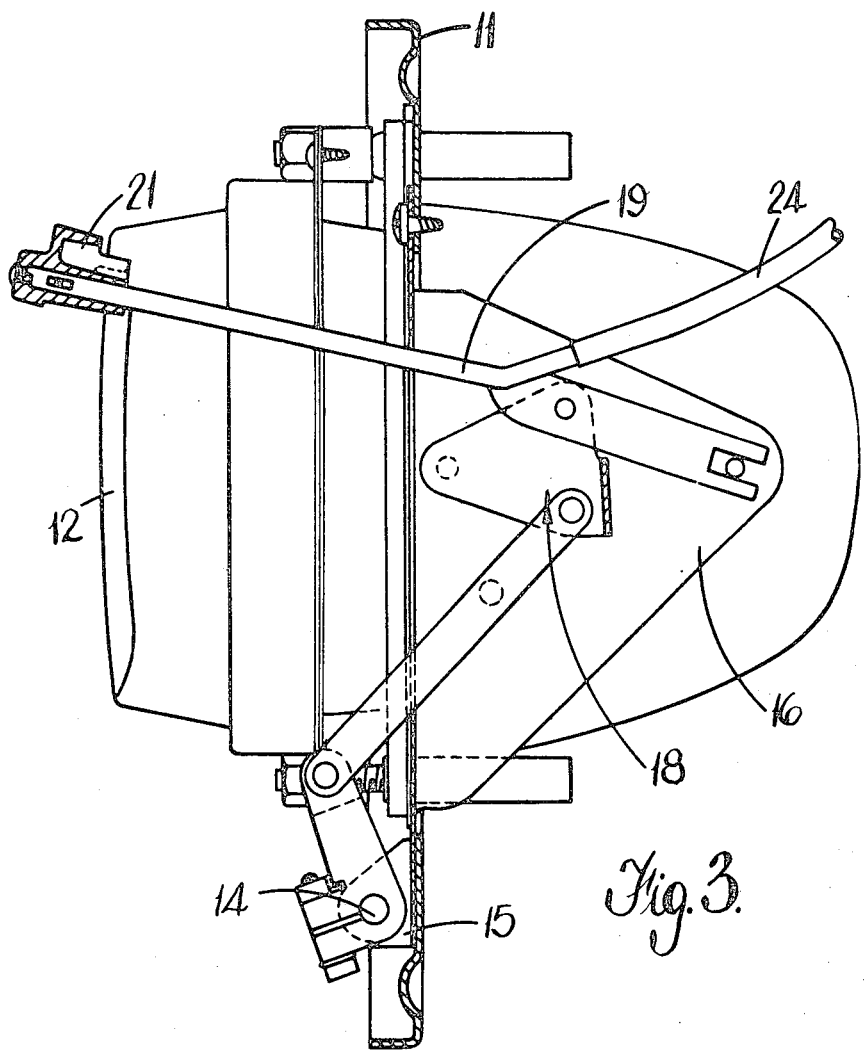
Figure 4:
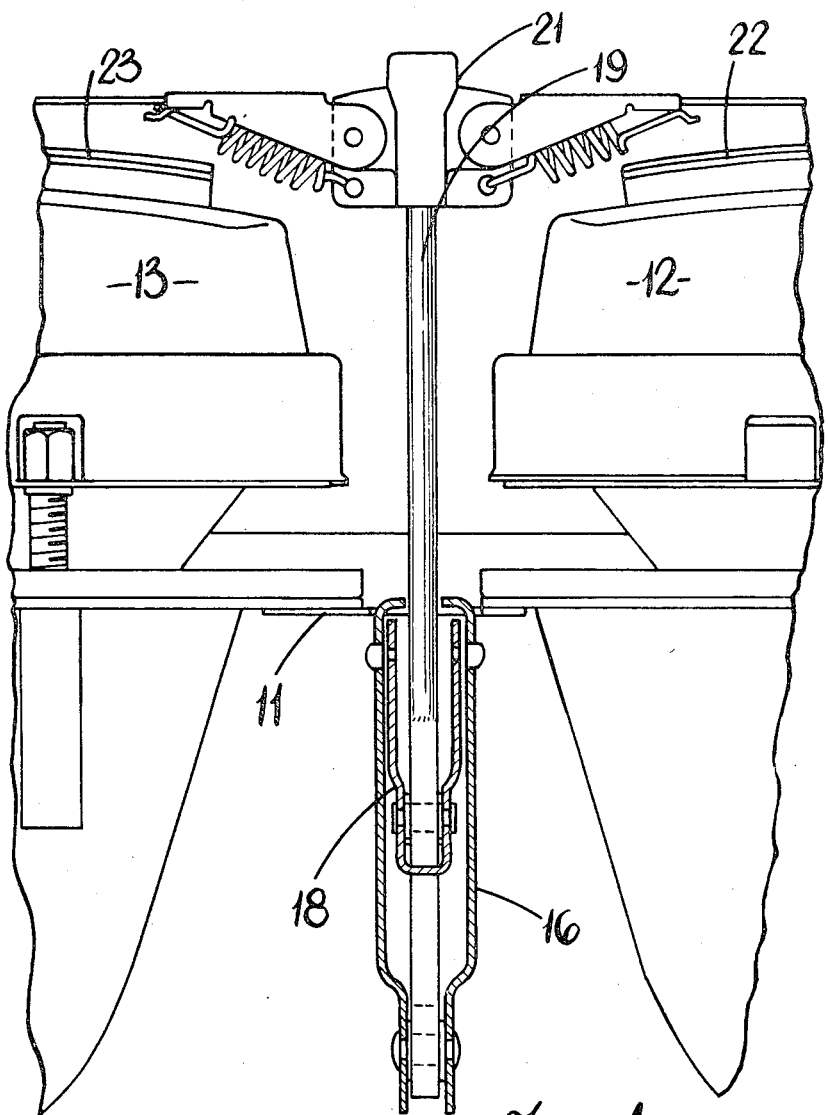

One example of the invention is illustrated in the accompanying drawings, wherein, FIG. 1 is a fragmentary perspective view of a headlamp assembly, FIG. 2 is an enlarged fragmentary front elevational view of the assembly shown in FIG. 1, FIG. 3 is a fragmentary, part sectional view generally on the line 3—3 in FIG. 2, and FIG. 4 is a fragmentary plan view, partly in section, of the assembly shown in FIG. 1.

Referring to the drawings, the headlamp assembly includes a sheet metal bulkhead 11 which is secured to the front of the body of a road vehicle so as to extend transversely of the vehicle. The bulkhead 11 carries two pairs of headlamp units, and associated with each pair of headlamp units is a headlamp wiper unit. The two pairs of headlamp units together with their associated wiper units are identical, and so only the right-hand pair of headlamp units and their associated headlamp wiper unit will be described. A pair of rectangular headlamp units 12,13 are secured to the bulkhead 11 adjacent one another, and are adjustably mounted on the bulkhead 11 so that the units 12,13 can be manually adjusted to set the inclination of their respective beams. The units 12,13 incorporate adjustment means for altering the inclination of their beams either manually or automatically to compensate for changes in the attitude of the body of the vehicle due to loading of the vehicle.

Secured to the rear surface of the bulkhead 11 is a drive motor (not shown) which drives a shaft 14 for reciprocatory angular movement, that is to say the drive motor rotates the shaft 14 clockwise through a predetermined angular distance and then anti-clockwise through the same distance, the shaft 14 being so moved continuously while the drive motor is running. The shaft 14 extends parallel with the bulkhead 11 across the front of the vehicle, and is supported in a pair of bearing brackets at opposite ends of the bulkhead 11, the right-hand bearing bracket 15 being shown in FIG. 1. Secured to the bulkhead 11 between the headlamp units 12,13 and extending rearwardly from the bulkhead 11 is a wiper unit support structure 16. A crank arm 17 is secured to the right-hand end of the shaft 14 for movement therewith, and coupled to the crank arm 17 through a linkage arrangement 18 carried by the structure 16 is a wiper arm 19. The wiper arm 19 extends forwardly through a slot in the bulkhead 11, between the headlamp units 12,13. At its free, forward end the wiper arm 19 carries a wiper assembly 21 including a pair of wiper blades 22,23. The wiper blades 22,23 extend in opposite directions, into engagement with the lenses of the headlamp units 12,13 respectively. The wiper blades 22,23 are pivotally mounted at the rod 19, and are spring loaded into engagement with the lenses of their respective headlamp units.

The lenses of the headlamp unit 12,13 are curved both in a vertical direction and in a horizontal direction. The wiper blade 22,23 are of generally conventional form, and so the normal mounting of the blades in their respective carriers ensures that the blades, which extend horizontally, conform to the horizontal curve of the lenses of their respective headlamps. However, the radius of the curves of the headlamp units in a vertical direction is in the order of 24 inches, and so if the arm 19 was pivoted at its end remote from the wipers at a fixed point, then the arm 19 would have to be approximately 24 inches long to ensure that the wiper blades remain in engagement with the headlamp lenses throughout the full vertical stroke of the wipers. However, the linkage 18 which transmits drive from the shaft 14 to the arm 19 is so constructed that the arm 19 has an effective length of 24 inches although its actual length is considerably shorter. Thus the linkage 18 is so constructed that it transmits movement to the arm 19 such that the wiper blades 22,23 follow the vertical contours of the lenses of their respective lamp units 12,13.

The arm 19 is hollow, and at its rear end is connected to a flexible pipe 24 which receives windscreen washing fluid when the windscreen washers of the vehicle are operated. At its forward end the arm 19 communicates with a pair of jets (not shown) which are integral with the central boss of the wiper assembly 21. The jets are so aligned that when the windscreen washers of the vehicle are operated then washing fluid is supplied through the pipe 24, the arm 19 and the jets onto the lenses of the headlamp units 12,13 respectively.

The drive motor which drives the shaft 14 is controlled by a switch which is operated when the windscreen washers of the vehicle are operated. The arrangement is such that when the windscreen washers of the vehicle are operated, then the drive motor is energized for a period of time equivalent to one complete stroke of the wipers 22,23 that is to say the drive motor is energized to drive the wipers 22,23 from their uppermost, rest position to a lower limit position where the wipers are at the lower edges of the lenses of their respective headlamp units, and then back to their upper rest position. As stated above, since the windscreen washers of the vehicle are operated, then during the complete stroke of the wipers 22,23 washing fluid will be directed onto the lenses of the headlamp units 12,13.

The wiping arrangement of the left-hand pair of headlamps is identical with that described above, the shaft 14 and the drive motor being common to both right-hand and left-hand wiper units. In use, the bulkhead 11 and the surrounds of the right-hand and left-hand headlamp units are covered by a decorative assembly so that only the lenses of the headlamp units are exposed. If desired, the decorative assembly can be such that in the rest position of the wiper units, the wiper blades are hidden behind the decorative assembly.

In a modification one of the headlamp units is replaced by a lighting unit which includes means for sensing light from oncoming vehicles. The lighting unit produces a beam of light illuminating the road in front of the vehicle, and incorporates a mechanism which is operated by said means for sensing light from oncoming vehicles, for cutting off sufficient of the projected beam produced by the light unit to avoid dazzling of the driver of an oncoming vehicle by the projected beam.

Having thus described my invention what I claim as new and desire to secure by Letters Patent is:

1. A lamp assembly, for a road vehicle, including a mounting plate which in use extends transversely of a road vehicle, a pair of light units each of which has a curved lens, means mounting said light units adjacent to one another on said mounting plate in such a manner that in use said light units will be at oneside or the other of the vehicle, a wiper arm, said wiper arm extending between said light units, a pair of wipers, means mounting said pair of wipers at one end of said wiper arm so that said wipers extend in opposite directions from said wiper arm and are engageable with the lenses of said light units respectively, and, a drive linkage for reciprocating said wiper arm in a plane passing between said light units, said linkage being coupled to said wiper arm, and causing movement of said wipers in an arc of radius of curvature substantially equal to the radius of curvature of said light unit lenses, the wiper arm itself being shorter than said radius of curvature.

2. An assembly as claimed in claim 1 wherein said linkage is driven by a shaft which is reciprocated about its longitudinal axis in use.

3. An assembly as claimed in claim 2 wherein said shaft similarly drives a second wiper arm associated with a pair of light units mounted in use on the side of the front of the vehicle remote from the first mentioned pair of light units.

4. An assembly as claimed in claim 1, further including a system for supplying washing liquid to the lenses of the light units.

5. An assembly as claimed in claim 4 wherein the wiper arm is hollow and carries a pair of jets through which washing fluid is directed onto said lenses, as jets communicating with a reservoir of washing liquid through the wiper arm.

6. A lamp assembly, for a road vehicle, including a mounting plate which in use extends transversely of a vehicle, a pair of light units each of which has a curved lens, means mounting said light units adjacent one another on said mounting plate in such a manner that in use said light units will be at one side or the other side of the vehicle, a wiper arm, said wiper arm extending between said light units, a pair of wipers, means mounting said pair of wipers on one end of said wiper arm, so that said wipers extend in opposite directions from said wiper arm and are engageable with said lenses of said light units respectively, means for reciprocating said arm in a plane passing between said light units so that said wipers wipe the lenses of said light units respectively, there being a rest position which said wipers assume when inoperative, and, a decorative member associated with said mounting plate, said decorative member being arranged to mask the wipers when the wipers are in said rest position.

* * * * *

UNITED STATES PATENT OFFICE
CERTIFICATE OF CORRECTION

Patent No. 3,686,704     Dated August 29, 1972

Inventor(s) John William Sharpe, et al

It is certified that error appears in the above-identified patent and that said Letters Patent are hereby corrected as shown below:

[73] Assignee: Joseph Lucas (Industries) Limited
Birmingham, England

Signed and sealed this 17th day of April 1973.

(SEAL)
Attest:

EDWARD M. FLETCHER, JR.
Attesting Officer

ROBERT GOTTSCHALK
Commissioner of Patents